2 Sheets—Sheet 2.
W. R. HAMILTON.
Ball Trap.
No. 232,347. Patented Sept. 21, 1880.
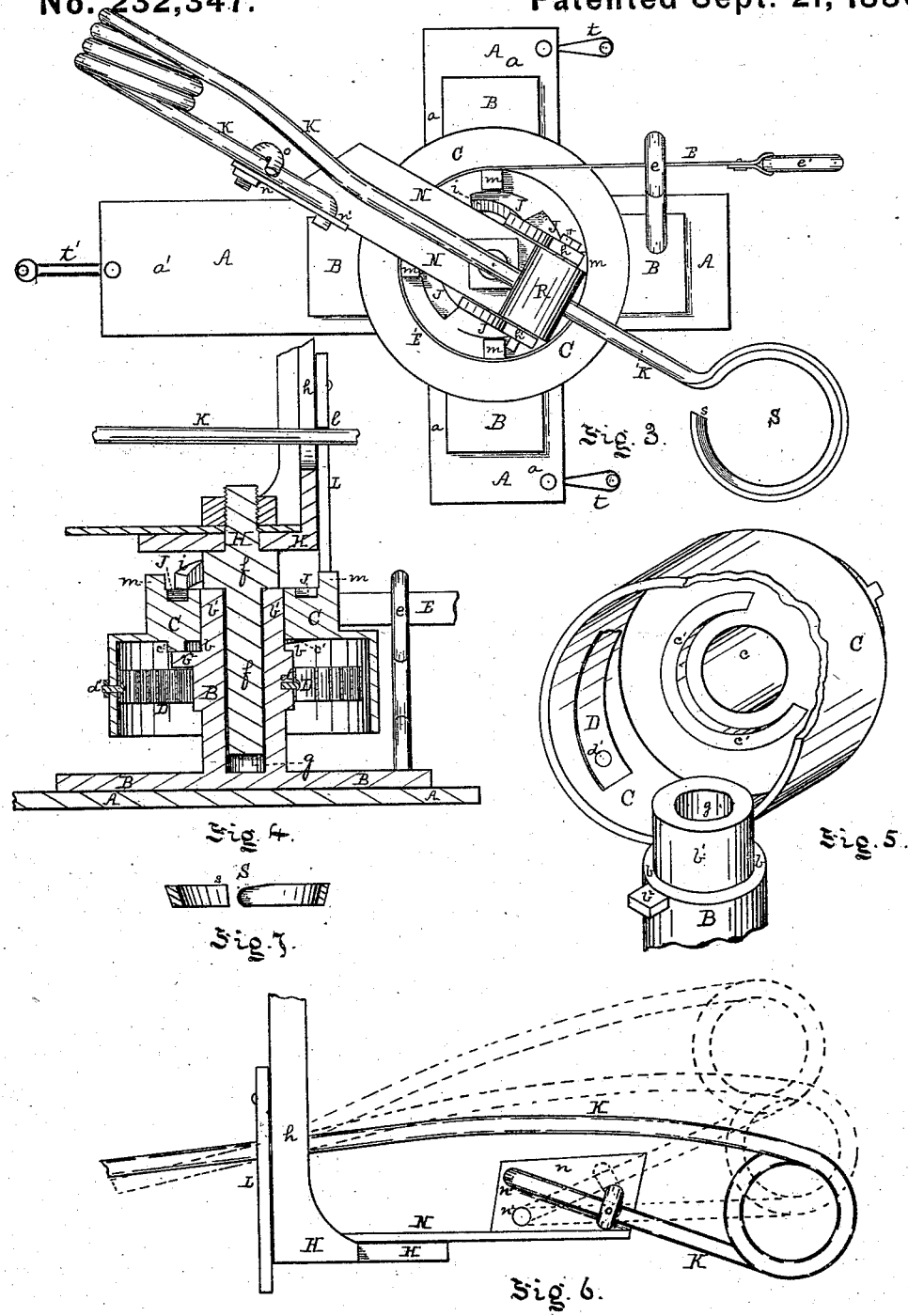
Witnesses
J. R. Carhion
Clarence Burleigh
Inventor
William R. Hamilton
by James I. Kay
his Attorney

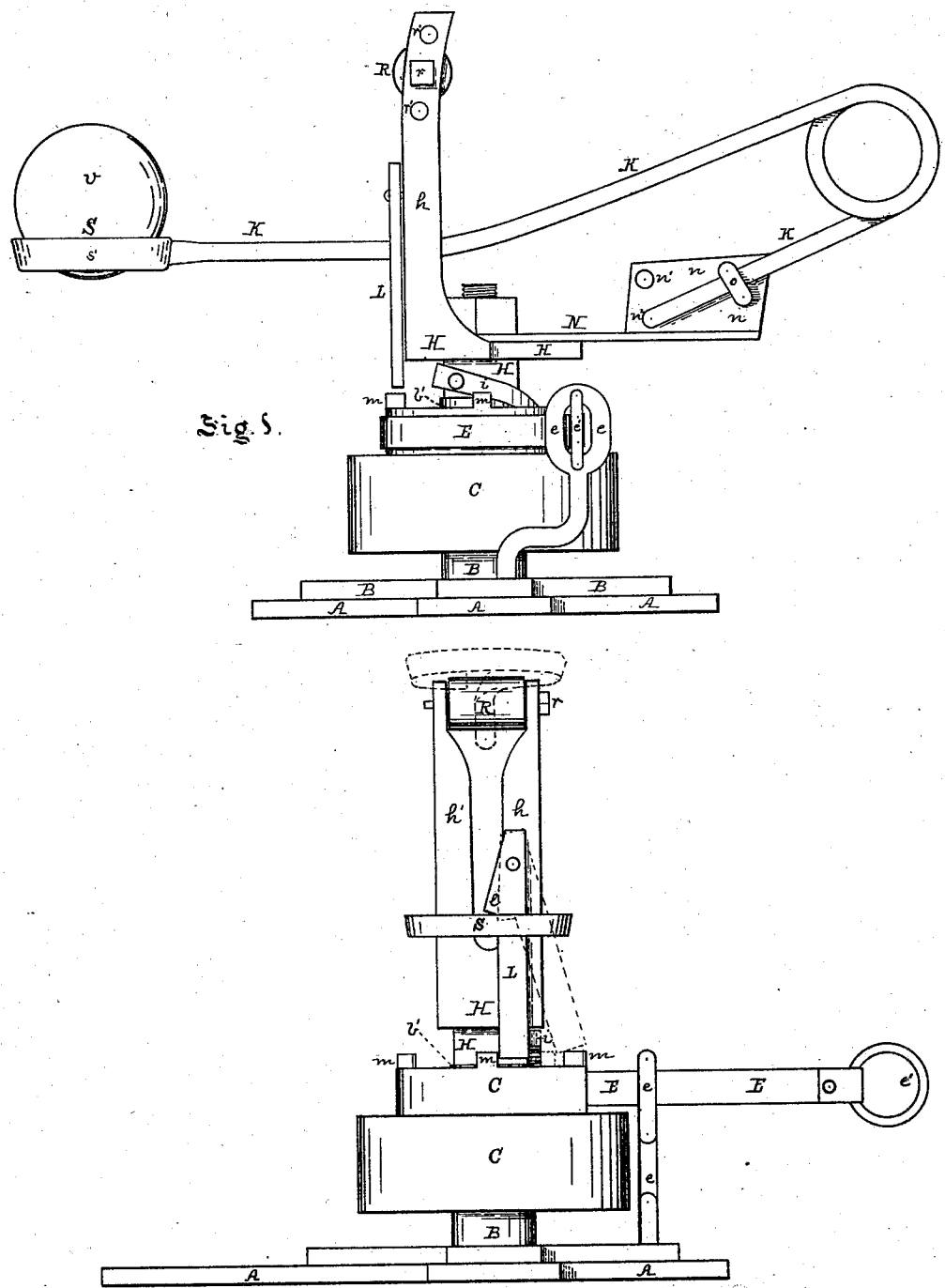

UNITED STATES PATENT OFFICE.

WILLIAM R. HAMILTON, OF PITTSBURG, PENNSYLVANIA.

BALL-TRAP.

SPECIFICATION forming part of Letters Patent No. 232,347, dated September 21, 1880.

Application filed November 6, 1879.

*To all whom it may concern:*

Be it known that I, WILLIAM R. HAMILTON, of Pittsburg, in the county of Allegheny and State of Pennsylvania, have invented a new and useful Improvement in Rotary Ball-Traps; and I do hereby declare the following to be a full, clear, and exact description thereof, reference being had to the accompanying drawings, forming a part of this specification, in which—

Figure 1 is a side view of my improved trap. Fig. 2 is a face view. Fig. 3 is a top or plan view. Fig. 4 is a longitudinal vertical section of the pedestal, spring-case, and trap-body. Fig. 5 is a perspective view of the spring-case and part of the pedestal. Fig. 6 is a detached view of the spring-bar carrying the spring-arm, and Fig. 7 is a sectional view of the cup.

Like letters of reference indicate like parts in each.

My invention relates to glass-ball traps, or traps used by sportsmen to throw or discharge ball-targets for practice in shooting as a means of training for bird-shooting. It has special relation to traps of this character known as "rotary" traps, which throw the ball-targets in different directions, so as to give difficult shots, resembling the flight of birds when rising from cover.

My invention consists, first, in a stationary pedestal, on which the trap is mounted by means of a perpendicular shaft fitting within a cylindrical recess therein, and on which is mounted a spring-case inclosing a spring connected to the spring-case and pedestal, the spring-case being adapted by its forward rotation to impart a like rotary movement to the trap, and by its backward rotation, caused by the recoil of the spring, to discharge the trap; second, in devices for imparting a forward and a backward rotary motion to the spring-case or pulley; third, in devices on the spring-case for discharging the trap by means of the recoil of the spring; fourth, in devices for raising the spring-case on its recoil to bring the discharging devices in line with the trigger of the trap; fifth, in devices on the spring-case and trap-body for imparting a rotary motion to the trap when the spring-case is given a forward rotation; sixth, in devices for changing the angle of connection of the spring-arm carrying the balls to vary the force of its throw; and, lastly, in details of construction, hereinafter set forth.

To enable others skilled in the art to make and use my invention, I will proceed to describe its construction and operation.

In the accompanying drawings, A is the base of my improved trap, which is fastened to the ground by means of the wire loops $t$ $t$, extending from the arms $a$ $a$ and connected to stakes driven into the ground in front of the trap, and the elastic band or cord $t'$, attached to the long arm $a'$ and passing over a stake in the rear of the trap.

B is the stationary pedestal, which is bolted to the base A. It is circular in shape, and has an annular seat, $b$, formed thereon, upon which the spring-case or pulley C rests, the cylindrical extension $b'$, above the seat, passing through a cylindrical opening, $c$, in the spring-case.

The spring-case C is cylindrical in form, and incloses the spring D between it and the pedestal, the spring being secured to the pedestal at $d$ and to the inner face of the case at $d'$.

On the inner surface of the top of the case, extending part way around the cylindrical opening $c$, beyond the seat $b$ of the pedestal, is the double incline $c'$, which rests upon and plays over a lug, $b^2$, extending horizontally from one side of the annular seat $b$, said lug and incline serving to impart a rising-and-falling motion to the spring-case during its rotation, for purposes set forth.

A forward rotation is imparted to the spring-case by means of the strap or cord E, attached thereto and fitting around its periphery, the spring D being compressed or coiled during such rotation, and causing its backward rotation by the opening or recoil of the spring.

The strap E works through the guide $e$ on the pedestal or base, and is drawn back around the spring-case by the recoil of the spring.

On the upper surface of the spring-case is the circular ratchet-row J, formed around the cylindrical opening $c$ and the dogs or knockers $m$.

In the center of the pedestal B is formed the cylindrical perpendicular recess $g$, into which the shaft $f$ fits, said shaft being rigidly attached to and extending down from the trap frame or body H, and the trap revolving on the pedestal by means of the shaft. The shaft is loose in said recess $g$, so that it can revolve freely, and can also rise and fall when any force is applied to it.

On the body H is pivoted the pawl $i$, which is arranged so as to fall or take into the circular ratchet-row J, before referred to, on the upper surface of the spring-case C, and hold when a forward motion is given the spring-case, imparting a like rotary motion to the body H, carrying the trap, but to slip over the ratchets when the spring-case is drawn back by the recoil of the spring.

The body H is provided with the upright guides $h\ h'$, between which the spring-arm K works, and at the top of the guides the elastic gum buffer or cushion R is secured by means of a rod, $r$, passing through the guides and buffer.

A series of holes, $r'$, are formed at the top of the guides for changing the position of the buffer on the guides.

The trigger L is pivoted to one of the guides $h$, the pivotal point being above the lip $l$ of the trigger, under which the spring-arm K is caught, so that when the arm is drawn down between the guides $h\ h'$ it will press the trigger aside, and as soon as it passes the lip the trigger will swing over, so as to hold the arm under the lip.

The trigger L extends down below the body H into line with the dogs $m$ on the spring-case, so that upon the backward movement of the spring-case the dogs will knock aside the trigger and free the spring-arm from the lip.

The dogs $m$ may either be formed at intervals on the top of the spring-case, as shown, or on the periphery thereof, and when the case C rests on the seat $b$ of the pedestal they do not come in line with the lower end of the trigger. When, however, by the rotation of the case C, it is raised by means of the lug $b^2$ and inclines $c'$, the lugs are brought in line with the trigger, and on the recoil of the spring serve to knock aside the trigger and thus discharge the trap. As the incline $c'$ slopes off at both ends the spring-case is only raised during part of its rotation, and falls again to draw the dogs $m$ down out of line with the trigger during the further rotation of the trap, which rotation is continued by the inertia after the strap E is drawn out, the pawl $i$ slipping over the circular ratchet J.

The spring-arm K is attached to the spring-bar N, which is securely bolted to the body H. The spring-arm is formed of an angular or round bar of steel properly tempered, and is coiled to obtain more elasticity and a stronger throw when the trap is discharged. It is secured to the bar N by bending one end at a right angle, and passing it through one of the series of holes $n'\ n^2$ in the upright lip or flange $n$ of the bar N and under the hook-bolt $o$, which passes through the flange and is secured by a nut.

In order to change the tension of the spring to give a weak or strong throw, which is in some cases desirable, a series of two or more holes, $n'\ n^2$, is formed on the flange, and by changing the position of the rod in these holes and under the hook-bolt $o$ the rod may be secured at a different position on the spring-bar, as shown in Fig. 6. The spring-arm K extends between the guides $h\ h'$ on the body H, under the buffer R, and its end is bent around to form the cup S, for the reception of the ball-target.

The cup is formed by flattening the rod to make it wider and thinner in cross-section and bending around to form nearly a complete circle, the end $s$ being left free to spring. By thinning and flattening the spring and leaving the end $s$ free a greater spring is given to the cup, which enables it to spring open when the ball is placed therein, and so grasp the ball firmly. The cup is also bent in such a way as to make it funnel-shaped, thus adapting it to hold different-sized balls, and on account of the spring of the cup grasp them all firmly.

The cup S may be covered with gum, cloth, or other material, $s'$, to give it a soft and yielding surface.

The operation of my improved trap is as follows: The trap is secured firmly to the ground by means of the wire loops $t\ t$ and elastic band $t'$, passing over stakes, and a pulling-cord is attached to the ring $e'$ of the strap and extends to the line where the shooter stands. The spring-arm K, carrying the cup S, is drawn down until it catches under the lip $l$ of the trigger L. The ball-target $v$ is then placed in the cup S, which yields to the pressure and grasps the ball firmly to prevent its escape during the rotation of the trap-body carrying the spring-arm. When the shooter is ready the strap E is drawn out quickly by the puller, which causes the forward rotation of the spring-case C, compressing the spring D, and by means of the ratchet J and pawl $i$ imparting a like rotation to the trap-body H on its perpendicular shaft $f$. The rotation of the trap-body is continued by its inertia after the strap is drawn out, and at the command of the shooter the puller suddenly relaxes the cord or strap, and the spring D, by its recoil, draws back the spring-case, which is raised by the double incline $c'$ and lug $b^2$ during its backward rotation until the dogs or knockers $m$ come in line with the trigger L, and one of the dogs knocks aside the trigger and frees the spring-arm K therefrom. As soon as the arm K is freed from the trigger it is raised by the coil in the arm until it comes against the buffer R, when the ball is thrown into the air to form a target for the marksman's shot.

The whole operation is very rapid, and as any one of the series of knockers $m$ may draw aside the trigger, and the trap is still rotating when discharged, it is impossible to tell in which direction the ball will be thrown, and thus a very difficult shot is obtained. As soon as the trap has been discharged the incline $c'$ in the spring-case passes off the lug $b^2$, lowering the case and drawing the dogs m out of line with the trigger, thus permitting the further rotation of the trap. As the shaft f is free to rise in its bearing, any jar caused by the discharge of the trap serves only to raise the trap in its bearing, thus preventing the jarring of the base or stand A and the consequent loosening of its connection to the ground.

The advantages of my improved trap are, that the direction of the throw of the trap cannot be predetermined or the trap arranged to throw in any particular direction by the puller, as the trap is free to rotate on its shaft independent of the mechanism from which the power is obtained, and may be discharged by any one of the knockers. The discharging mechanism is certain and positive in its action. The trap can be adjusted so as to regulate the tension and throw of the spring-arm, and is adapted to hold ball-targets of different sizes. The trap is compact in form. The spring inclosed therein in its recoil to discharge the trap rewinds the pulling-strap, and the jar on the discharge is compensated for in the machine.

It is evident that the trap can be arranged as a double trap by adding another guide, spring, and trigger to the trap-body; also, that the knocker or knockers may be attached to the pulling-strap, and the lug and incline for raising the spring-case may then be dispensed with. The rotation of the trap-body carrying the spring-arm may also be produced without the pawl-and-ratchet row by causing the knockers to rise as the pulling-strap is drawn out and press against the end of the trigger, thus imparting the forward rotation to the trap.

What I claim as my invention, and desire to secure by Letters Patent, is—

1. A rotary ball-trap mounted on a stationary pedestal by means of a solid perpendicular shaft extending into a cylindrical journal formed therein, in combination with a revolving case or pulley mounted on and surrounding said pedestal, and adapted by its forward rotation to impart a similar rotation to the trap, and by its backward rotation to discharge the trap, substantially as and for the purposes set forth.

2. In a rotary ball-trap, the spring-case C, mounted on the pedestal B, and provided with the pulling-strap E, attached to the periphery thereof, and adapted to impart a forward rotation thereto, and the spring D, inclosed therein and adapted to impart a backward rotation thereto, substantially as set forth.

3. The spring-case C, mounted on the pedestal B, and inclosing the spring D, and provided with mechanism, substantially as described, adapted to discharge the trap by the recoil of the spring inclosed therein, substantially as set forth.

4. The trap-body H, carrying the spring-arm K, in combination with the trigger L, pivoted thereto, and one or more knockers or discharging devices, m, adapted to discharge the trap by the recoil or backward movement of the spring-case C, substantially as and for the purposes set forth.

5. The combination of the pedestal B, provided with the lug $b^2$, the spring-case C, provided with the double incline $c'$, the spring D, and one or more knockers or discharging devices, m, attached to the spring-case and adapted to set off the trap, substantially as and for the purposes set forth.

6. The combination of the spring-case C, mounted on and around the pedestal B, and provided with the ratchet-row J, and the trap-body H, mounted on said pedestal, and provided with the pawl i, substantially as and for the purposes set forth.

7. The spring-case C, mounted on the pedestal B, provided with the ratchet-row J and one or more knockers or discharging devices, m, in combination with the trap H, mounted on said pedestal, and provided with the pawl i and trigger L, substantially as and for the purposes set forth.

8. The spring-bar N, secured to the trap-body H, and provided with the flange n, having a series of holes, $n'$ $n^2$, in combination with the spring-arm K and hook-bolt o, or other suitable connecting device, whereby the angle of connection of the arm to the bar may be changed as desired, substantially as described.

In testimony whereof I, the said WILLIAM R. HAMILTON, have hereunto set my hand.

WILLIAM R. HAMILTON.

Witnesses:
JAMES I. KAY,
F. G. KAY.